US006208686B1

United States Patent
McDonald et al.

(10) Patent No.: US 6,208,686 B1
(45) Date of Patent: Mar. 27, 2001

(54) SYSTEM AND METHOD FOR DYNAMIC AMPLITUDE ADJUSTMENT OF MODULATING SIGNAL IN FREQUENCY MODULATED TRANSCEIVERS

(75) Inventors: Patric McDonald, Granite Bay, CA (US); Richard Lee, Bellevue, WA (US); Peter Castagna, Renton, WA (US); Mark McMillen, Seattle, WA (US); Dick Read, Bremerton, WA (US)

(73) Assignee: Innova Corporation, Seattle, WA (US)

( * ) Notice: Subject to any disclaimer, the term of this patent is extended or adjusted under 35 U.S.C. 154(b) by 0 days.

(21) Appl. No.: 08/896,682

(22) Filed: Jul. 18, 1997

(51) Int. Cl.[7] ........................................................ H04L 5/16
(52) U.S. Cl. ........................ 375/219; 375/225; 375/296; 375/297; 375/346
(58) Field of Search ............................ 370/242; 371/20.1, 371/20.4; 375/224, 225, 285, 345, 296, 297, 346; 455/214, 219, 226.1, 226.3

(56) References Cited

U.S. PATENT DOCUMENTS

| 3,649,909 | * | 3/1972 | Ort et al. ............................... 455/115 |
| 4,556,982 | * | 12/1985 | Dunn ..................................... 375/224 |
| 4,639,938 | * | 1/1987 | Kennett ................................ 375/296 |
| 4,766,600 | * | 8/1988 | Martin .................................. 375/224 |
| 5,233,628 | * | 8/1993 | Rappaport et al. ................... 375/224 |
| 5,303,268 | * | 4/1994 | Tsutsumi et al. ..................... 375/296 |
| 5,396,190 | * | 3/1995 | Murata ................................. 330/149 |
| 5,404,378 | * | 4/1995 | Kimura ................................. 375/296 |
| 5,539,772 | * | 7/1996 | Fasulo, II et al. .................... 375/224 |
| 5,732,333 | * | 3/1998 | Cox et al. ............................. 455/126 |
| 5,748,678 | * | 5/1998 | Valentine et al. .................... 375/297 |
| 5,751,766 | * | 5/1998 | Kletsky et al. ....................... 375/224 |
| 5,764,694 | * | 6/1998 | Rahamim et al. .................... 375/224 |
| 5,898,338 | * | 4/1999 | Proctor et al. ....................... 330/149 |
| 5,905,760 | * | 5/1999 | Schnabl et al. ...................... 375/296 |
| 5,910,965 | * | 6/1999 | Ierfino et al ........................ 375/220 |

OTHER PUBLICATIONS

Cite: 47CFR2.985, Part 2, Sec. 2.985, http://frwebgate.access.gpo.gov/cgi–bin/get–cfr.cgi.

* cited by examiner

Primary Examiner—Stephen Chin
Assistant Examiner—Shuwang Liu
(74) Attorney, Agent, or Firm—Squire, Sanders & Dempsey

(57) ABSTRACT

A system and method for dynamically optimizing occupied bandwidth of a direct modulated FM radio comprises a remote receiver that periodically monitors the received output of a local transmitter and compares the received output occupied bandwidth to a reference level. If the monitored level of the demodulated signal unacceptably exceeds the reference level an error message is developed and sent back to the local transmitter to cause the output of the local transmitter to be adjusted to more closely conform to the desired spectrum output mask. An alternative embodiment is also disclosed in which temperature and operating frequency are monitored at the local transmitter and a correction factor appropriate for that operating temperature and frequency are applied.

2 Claims, 3 Drawing Sheets

SYSTEM AND METHOD FOR DYNAMIC AMPLITUDE ADJUSTMENT OF MODULATING SIGNAL IN FREQUENCY MODULATED TRANSCEIVERS

FIELD OF THE INVENTION

The invention relates to digital microwave radios, and in particular relates to methods and systems for stabilizing FM deviation or occupied bandwidth of the transmit output signal of digital FM microwave radios.

BACKGROUND OF THE INVENTION

Digital radio terminals have become particularly advantageous in a number of key types of communication. High frequency point to point communications are used by, among others, cellular operators, telecommunications operators, private network operators, governments, and large telecommunications operations.

While many modulation techniques are available for use on microwave digital radios, such as QPSK, QAM and so on, cost and other issues have militated in favor of the use of direct modulated oscillators, or direct modulated FSK systems.

Operators of such microwave digital radios are typically assigned to specific frequencies, or channels, for their communications. Each channel is characterized by a center frequency and a spectrum emission mask or template which permits a higher energy level at the center frequency and decreasing energy levels as the transmitted frequency diverges (in either direction) from the center frequency. The spectrum emission mask, sometimes referred to simply as the "mask," is defined by the federal government, and transmissions outside the mask can interfere with transmissions on adjacent channels as well as resulting in serious adverse consequences to the system operator. Such interference with neighboring channels is referred to "stepping on" those channels.

Superficially, it would seem to be straightforward to avoid stepping on adjacent channels simply by setting the direct modulated FSK occupied bandwidth of the system. However, this has been proven not to be correct. Most importantly, it is now recognized that the transmit occupied bandwidth—and therefore radio performance—can vary significantly with temperature or frequency in a direct modulated FM system. While temperature varies relatively slowly, it can vary over a significant range. This can cause a carefully tuned output spectrum to exceed the mask.

The historical approach to compensate for temperature variations and avoid stepping on adjacent channels has been to reduce the maximum bandwidth; however, this has the unacceptable effect of reducing the FM demodulated signal-to-noise ratio. This reduction in the demodulated signal amplitude can result in significantly poorer performance for the radio network. A common approach to representing such degradation is to perform a conversion of the occupied bandwidth from the frequency domain to the time domain. Where multiple digital modulation levels are used, the result of the time conversion is a plurality of random time-variant waveforms of different levels which are generally arcuate and, plotted together, take the general shape of an eye. This is frequently referred to as "the eye", and such terminology will be used from time to time hereinafter. A reduction in the demodulated signal amplitude—and the corresponding reduction in the occupied bandwidth—basically is depicted in the eye by the arcuate waveforms which form the eye becoming less arcuate (i.e., flatter) and moving closer to one another, such that the overall impression is that the eye opening becomes smaller. An enhancement in the demodulated signal amplitude—and the corresponding increase in occupied bandwidth—is depicted by the waveforms becoming more arcuate and moving further apart. This is commonly referred to as the eye becoming larger. A larger eye is generally more desirable.

Variations in frequency, even with constant temperature, can also lead to significant variation in occupied bandwidth. Thus, for tunable systems which can be operated at any of a wide range of frequencies, undesirable occupied bandwidth changes can result from changes in selected channel. For many operators of microwave radio systems, the frequency of operation is chosen on-site. Thus, the occupied bandwidth of the system must be readily configurable outside of the manufacturing facility, and must take into account the variations in occupied bandwidth which can result from changes in frequency at even a stable temperature.

As a result, there has been a long-felt need for a system which dynamically maintains optimized occupied bandwidth over a significant range of operating temperatures and frequencies.

SUMMARY OF THE INVENTION

The present invention provides a system and method for dynamically optimizing the system transmitted occupied bandwidth of a radio system and maintaining that energy at a level closely approximating the mask. More specifically, in a first embodiment of the invention, in a system comprising a transmitter and a receiver, the energy received from the transmitter at the receiver is monitored periodically. The monitoring cycle is matched to the reasonable period for meaningful variation in the occupied bandwidth. The measured FM demodulator output voltage level (the recovered eye) is then compared to acceptable voltage levels and, if the difference exceeds a predetermined threshold, a control packet is fed back to the transmitter. The control packet is then supplied to the microprocessor on the transmitter side, and the amplitude of the transmitter waveform is adjusted either upward or downward to optimize occupied bandwidth, which typically involves maximizing occupied bandwidth while remaining within the mask. It can thus be seen that this embodiment of the invention comprises a form of digital feedback from the remote receiver side of one of a pair of transceivers to send a control message to the transmitter portion of the other one of the pair of transceivers to modify the output. It will be appreciated that, within a network of such transceivers, each transmitter portion will receive individualized feedback transmitted by each associated receiver portion, with the feedback path including the remaining transmitter/receiver portions of the transceiver pair.

In an alternative embodiment, the need for feedback from the receiver portion of the pair is not required. Instead, a method of predictive adjustment is implemented. In this embodiment, a data table is established reflecting the correlation between temperature and/or frequency and occupied bandwidth for the output waveform. Then, by monitoring both frequency and temperature at the transmitter, rather than relying on the outboard unit of the transceiver pair, the appropriate correction can be looked up in the data table and the correction made locally. As with the first embodiment, the correction is provided to the microprocessor of the transmitter to cause appropriate correction of the occupied bandwidth.

The invention may be better appreciated from the following Figures, taken together with the accompanying Detailed Description of the Invention.

DETAILED DESCRIPTION OF THE INVENTION

Figures 1, 2:
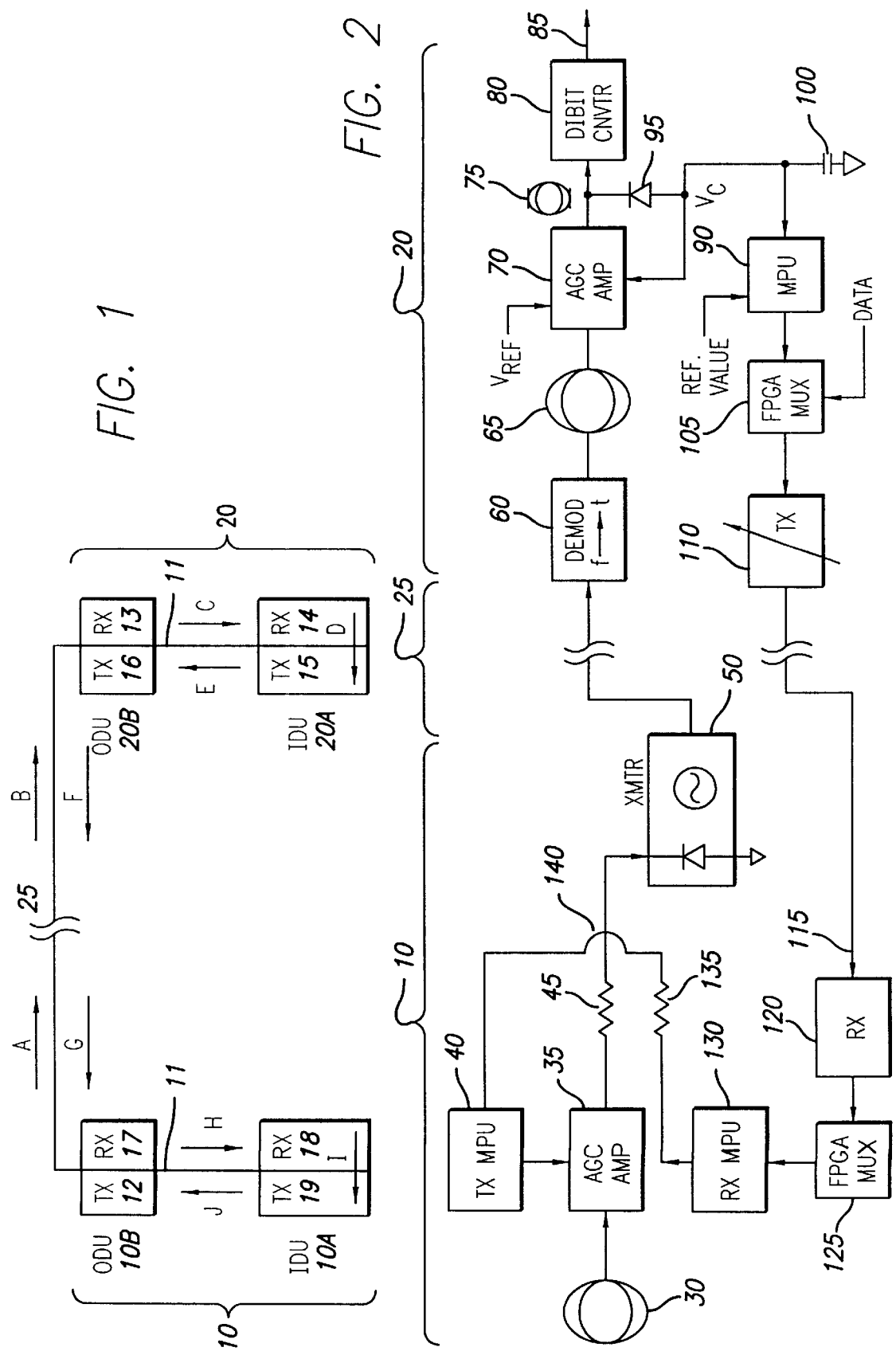
FIG. 1 illustrates in flow diagram form the operation of a first embodiment of the invention used in a microwave digital radio.
FIG. 2 illustrates in block diagram form a hardware representation of the embodiment of the invention shown in FIG. 1.

Referring first to FIG. 1, the operation of a first embodiment of the present invention is shown in a greatly simplified manner. A digital microwave radio network comprises a plurality of identical transceivers, shown for simplicity as local transceiver 10 and remote transceiver 20. In a presently preferred, but not required, arrangement, each transceiver is of the type described in U.S. patent application Ser. No. 08/874,661, entitled A System and Method of Radio Communications with Up-Down Digital Signal Link, filed Jun. 13, 1997, commonly assigned herewith and incorporated herein by reference. Typically, such transceivers comprise an indoor unit (IDU) 10A and 20A, respectively, and an outdoor unit (ODU) 10B and 20B, respectively, with each unit incorporating some transmitter functions and some receiver functions. In typical arrangements, the indoor unit and outdoor unit are connected by a single coaxial cable 11 which may be, for example several hundred meters in length. Such transceivers typically transmit in the gigahertz region, and the wireless link between them is shown at 25. In addition, in a typical arrangement both the indoor unit and the outdoor unit have microprocessors incorporated therein, as will be better appreciated hereinafter.

The process of the present invention begins at step A with the transmission of an output signal from the transmitter (TX) portion 12 of the local outdoor unit 10B. The occupied bandwidth of the signal is intended to conform to the spectrum mask assigned for the particular channel, but may vary due to frequency or temperature changes.

The transmitted signal is received at step B by the receiver (RX) portion 13 of the remote outdoor unit 20B. The FM demodulated received signal is compared to stored acceptable values, and an error value is ascertained. The error value is transmitted at C to the RX portion 14 of the remote IDU 20A, where it is processed into a message packet on the overhead channel by a microprocessor within the IDU 20A. The message packet is forwarded at step D from the RX portion 14 to the TX portion 15, where it is further processed and muxed with the data channel, then scheduled to be sent up the cable 11 to the TX portion 16 of the ODU 20B at step E.

The message is then transmitted at step F from the TX portion 16 of the remote ODU 20B. It is received at step G by the RX portion 17 of the local ODU 10B, and at step H forwarded down the cable 11 to be separated from the data channel by the RX portion 18 of the IDU 10A. The message packet is reformatted as an error signal and then provided at step I to a microprocessor in the local IDU 10A. The microprocessor in the local IDU 10A processes the error signal to develop a correction signal, which is forwarded up the cable 11 to the transmitter portion 12. The correction signal is combined with the conventional transmitter signal to yield a dynamically-adjusted output spectrum conforming to the required spectrum mask.

From the general description of FIG. 1, it can be seen that the present invention, in a first embodiment, involves remotely monitoring the signal transmitted from a local transceiver. The remotely monitored signal is used to develop an error message, which is then fed back from the remote transceiver to the local transceiver. Based on a correction signal developed from the error message, the output of the local transmitter is adjusted, as necessary, to maximize occupied bandwidth and not exceed the limits of the spectrum mask.

Referring next to FIG. 2, the automatic correction scheme of the present invention may be understood in greater detail. As with FIG. 1, a pair of microwave transceivers 10 and 20 communicate over the airwaves indicated at 25. The information transmitted in accordance with the present invention is typically carried on the overhead channel, while user data is carried on the user channel.

An "eye" 30 represents an intermediate signal internal to the transceiver 10 and ready to be transmitted. The "eye" 30 provides the input signal to an amplifier having automatic gain control, or AGC amp 35. The gain of the AGC amp 35 is controlled by a microprocessor 40 resident in the outdoor unit, or ODU, portion of the transceiver 10 and, for at least the present operation, associated with the transmit function. The output of the AGC amp 35 is supplied through a resistor 45 to a transmitter 50, which in simplest terms may be thought of as a varactor diode and an FM modulated microwave oscillator feeding an antenna (not shown).

The transmitter 50 outputs a particular distribution of energy, which is detected at a receiver portion of the transceiver 20. The receiver process begins by demodulating the signal in the FM demodulator 60. The FM demodulator 60 converts the transmitted frequency domain signal back to the time domain "eye" configuration, shown at 65, after which the signal is passed through an AGC amp 70 and converted to constant amplitude, as shown at node 75, through the use of a peak detection circuit as discussed below. The output is then passed through a dibit converter 80 and converted to a conventional digital signal, which is provided to the customer as the system output at 85. One suitable device for the AGC amp 70 is, for example, a Comlinear CLC522 amplifier.

In addition, the AGC amp 70 is capable of correcting the variance between the "eye" signal at 65 and a predetermined required eye amplitude at 75. This variance is supplied periodically to a microprocessor 90 in the remote transmitter portion of the transceiver 20 and also to the AGC amp 70 by virtue of a diode 95 and capacitor 100 which together serve as a peak detector circuit. The peak detector circuit measures the amplitude of the eye 65 and provide a DC level proportional to that amplitude, shown as $V_c$ in FIG. 2. The variance, or correction voltage $V_c$ is monitored by being sampled on the order of once per minute, although a range of acceptable sample rates can vary from a few hertz to one cycle every few minutes. Too high a sample rate, for example in the kilohertz range, may lead to instability, while too slow a sample rate, say one every few hours, may lead to insufficient responsiveness to variations, particularly variations in temperature.

The AGC amp 70 receives the correction signal $V_c$ and internally compares it to a predetermined, fixed voltage $V_{ref}$. Based on that comparison an internal gain control signal is generated, which causes the output of the AGC amp 70 to remain a fixed amplitude as shown at 75.

The microprocessor 90 generates a digital error correction signal in much the same way as the AGC generates an analog correction signal. The microprocessor 90 receives the DC signal $V_c$ from the peak detector circuit and, in response to the variance between the digitally represented Reference Value representative of the maximum permissible value and the signal $V_c$ (also converted to digital form by the microprocessor 90), provides an error message packet to a FPGA (Field Programmable Gate Array) Mux 105. The FPGA Mux 105 multiplexes the customer data channel DATA with the overhead channel to permit transmission of the combined signal from the transceiver 20 back to the transceiver 10. The output of the FPGA mux 105 is supplied to a transmitter portion 110 of the transceiver 20, where it is sent back to the transceiver 10.

The input 115 at the receiver portion of the transceiver 10 thus includes the error message packet to adjust, as necessary, any variance in the transmitted occupied bandwidth of transmitter 50. The signal is decoded by the receiver front end 120, and then supplied to the FPGA demultiplexer, or demux 125 of the transceiver 10. The FPGA mux 125 separates out the overhead channel data from the user channel, and supplies the error packet on the overhead channel to the receiver microprocessor 130. The microprocessor then supplies a control signal through a resistor 135 to the microprocessor 40, which generates a control signal to the AGC amp 35. The control signal modifies the AGC output signal, which is then supplied to the transmitter 50 to increase or decrease the output power as appropriate. It will be appreciated by those skilled in the art that the overall objective is to cause the eye 65 to remain constant, which represents an optimum occupied bandwidth.

Figure 3:
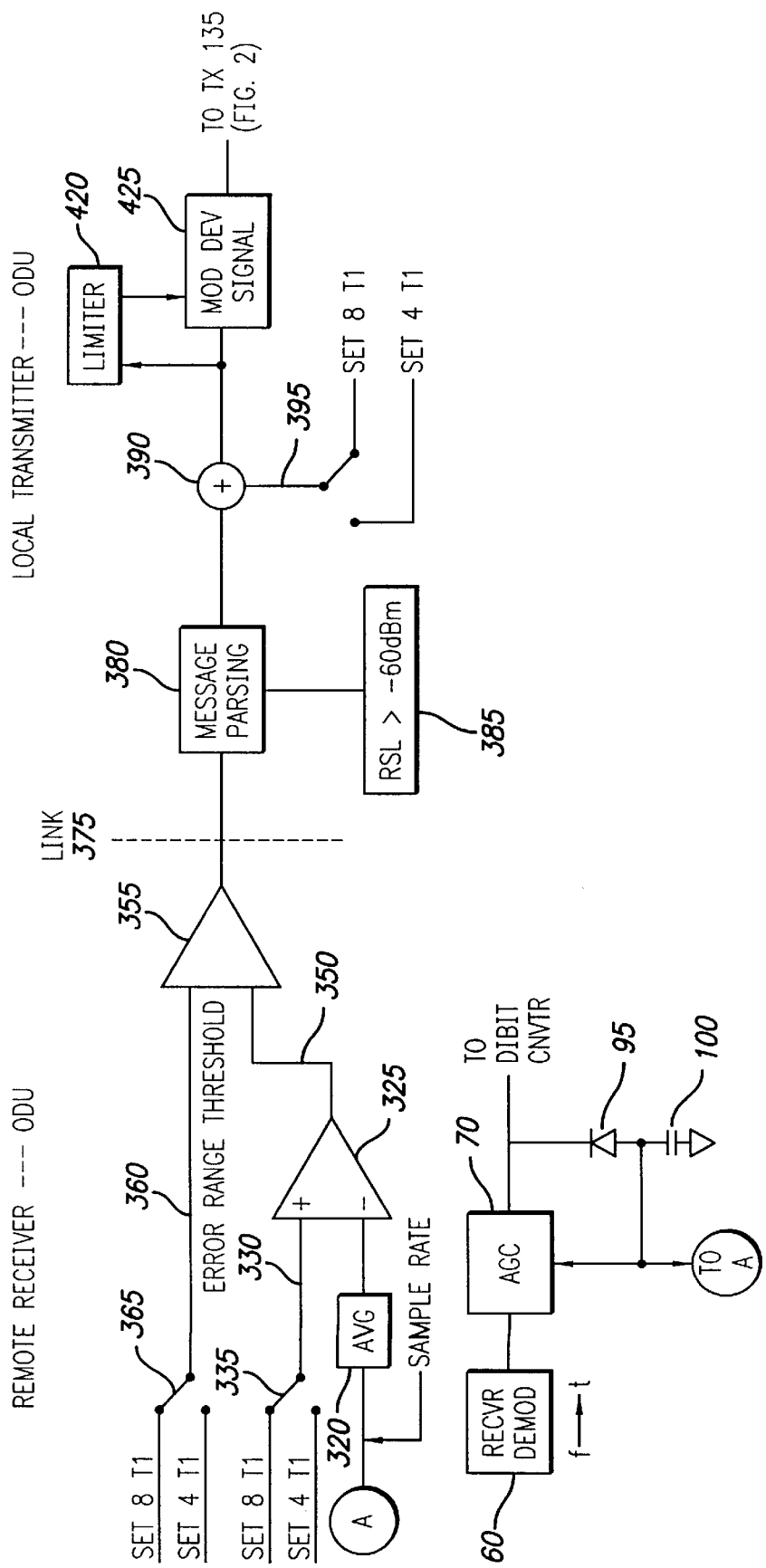
FIG. 3 illustrates in block diagram form a more detailed view of a portion of the embodiment shown in FIGS. 1 and 2.

Referring next to FIG. 3, the development of the error message and correction signal can be better appreciated. From the foregoing discussion, it can be appreciated that an error signal is developed, in an exemplary embodiment, in the receiver portion of the remote transceiver, and then fed back to the transmitter portion of the local transceiver. To aid in clarity, FIG. 3 illustrates in greater detail the relevant portion of the remote receiver, for developing the error signal, together with the relevant portion of the local transmitter, where the modulation deviation signal is developed. The intermediate elements, by which the error signal from the remote receiver is fed back to the local transmitter to cause a correction signal to be generated, have been omitted.

Although most of the operations shown in FIG. 3 are performed in software, the block diagram of FIG. 3 is believed to be the simplest way to provide a clear understanding of the invention. As discussed previously in connection with FIG. 2, the receiver demodulator 60 in the remote transceiver sends to the AGC amplifier 70 the eye 65. As discussed previously, the amplitude of the eye provides a representation of the occupied bandwidth of the transmitted signal. The measurement of the occupied bandwidth is provided from the peak detector as the voltage $V_c$ and converted to a digital word, nominally ten bits, as discussed in connection with MPU 90 in FIG. 2. The digital word is then provided (terminal "A") to an averaging circuit shown at 320. In the exemplary embodiment described herein, the averaging is actually performed by the microprocessor, and the hardware illustration is used for clarity only. The averaging circuit 320 samples the output $V_c$ of the peak detector circuit on the order of once per minute, although a fairly broad range of timing is acceptable as previously discussed. In an exemplary embodiment, the averaging circuit 320 averages the last 64 values.

The output of the averaging circuit 320 is supplied as the negative input to a comparator 325. The positive input to the comparator 325 is provided by a reference input 330. To accommodate, for example, capacities of both four T1 and eight T1 operation of the radio, a selector 335 may be provided; as previously noted, although this functionality is shown as hardware, in a presently preferred embodiment the selection is made in software and selects among look-up tables in which the reference data has been stored.

The output of the comparator 325 comprises an error signal 350, and provides an input to a second comparator 355. The second input to the comparator 355 is provided by a reference threshold signal 360, which functions to establish the minimum error which must be detected before an error message can be generated. This can be seen to create a digital hysteresis to avoid unnecessary cycling of the system. As with the input 330, the input 360 may select among, for example, a capacity for four T1's or eight T1's by virtue of selector 365. The capacity for a specific number of T1's is not critical to the operation of the system, and discussion of a capacity for four T1's or eight T1's is merely for purposes of illustration.

The output of the comparator 355 is converted, as shown in FIG. 3, to a digital word which is packetized for transmission across the wireless link shown at 375. The message including the packet is provided (through various components not shown in FIG. 3) to the transmitter of the local transceiver. The message is parsed to segregate the error message as shown in block 380, and is converted to a correction value. As a check to ensure adequate signal has been received, a received signal level check is provided at block 385. This function may be provided by hardware. Assuming the received signal level is adequate (which may be on the order of anything better than −60 dBm) the correction signal is summed at summing junction 390 with the standard expected static value (which is a function of the data rate), supplied on line 395. As with inputs 330 and 360, the input 395 may be selected between, for example, eight and four T1 operation. It will be appreciated that all three inputs 330, 360 and 395 preferably always select the same level.

The output signal from the summing junction 390 is then provided, subject to a limiter 420, to a modulation deviation signal circuit 425. It will be appreciated that the output of the summing junction 390 is the corrected output signal which maximizes the occupied bandwidth of the transmitter while remaining within the required spectrum mask. The output of the modulation deviation signal circuit 425 is then transmitted across the transmitter microprocessor.

Figure 4:
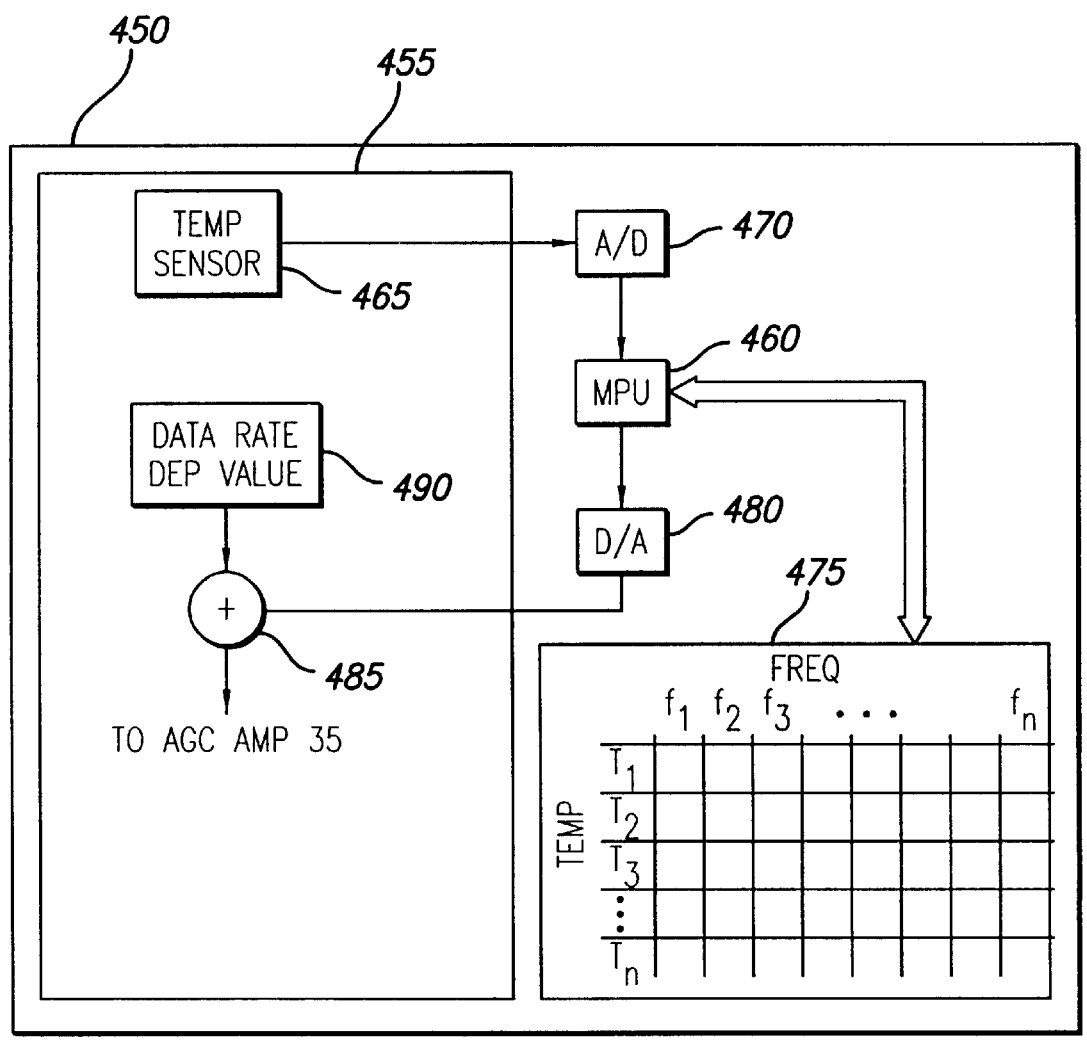
FIG. 4 illustrates in block diagram form a second embodiment of the invention.

Referring next to FIG. 4, an alternative embodiment of the present invention is shown. While the embodiment of FIGS. 1–3 uses feedback from the remote transceiver to provide the basis for a correction signal, there may be some instances in which such feedback is not desired. Nevertheless, it is still important that the output of the transmitter conform, as closely as possible, to the spectrum mask by adjusting to fluctuations in temperature at different operative frequencies.

To achieve these objectives, the embodiment of FIG. 4 includes, as with the earlier embodiment, an outdoor unit 450 having a transmitter portion 455 and a microprocessor

460. In addition, the transmitter portion 455 includes a temperature sensor 465, the output of which is converted to digital form in A/D converter 470. In an exemplary embodiment the A/D converter provides an eight bit representation, although the exact number of bits is not critical as long as it allows reasonable resolution of the range of operating temperatures. The output of the A/D converter 470 is provided as an input to the microprocessor 460, which uses the temperature data to identify from a lookup table 475 a correction factor appropriate for the operating frequency and operating temperature of the transmitter. In a typical arrangement, the data in the lookup table is developed at the time of manufacture, and includes appropriate correction factors for a range of frequencies and a range of temperatures. It will be appreciated that, although only one table 475 is shown in FIG. 4, a table is required for each capacity at which the radio may operate; i.e., if the radio can operate at a capacity for either four T1's or eight T1's, there will typically be a data set for four T1 operation and another data set for eight T1 operation.

The correction factor from the lookup table 475 is then provided to a D/A converter 480, which then supplies it to a summing junction 485 to be combined with the standard expected signal 490 in a manner otherwise identical to that described in connection with FIG. 2.

It can therefore be appreciated that a new and novel technique for optimizing conformance to the assigned spectrum mask for digital microwave radios has been described. It will be appreciated by those skilled in the art that, given the teachings herein, numerous alternatives and equivalents will be seen to exist which incorporate the invention disclosed hereby. As a result, the invention is not to be limited by the foregoing exemplary embodiments, but only by the following claims.

What is claimed is:

1. A method for optimizing transmitter output of a digital microwave radio including the steps of monitoring a characteristic of the transmitter, wherein the monitored characteristic is the transmitter output occupied bandwidth, generating a correction signal in response to the monitored characteristic, summing the correction signal with a conventional signal to conform the transmitter output to a predetermined mask, and repeating the monitoring, generating and adding steps periodically.

2. A digital microwave radio having transmitter and receiver portions comprising a bandwidth monitoring circuit for detecting the bandwidth transmitted from a remote radio, error logic for developing a digital error message representative of the difference between the monitored bandwidth and a reference value, a feedback circuit for providing the digital error message to the remote radio, and amplifier means for adjusting the output bandwidth in response to the digital error message.

* * * * *